No. 609,498. Patented Aug. 23, 1898.
M. T. CAMPBELL.
BICYCLE.
(Application filed Nov. 15, 1897.)
(No Model.) 2 Sheets—Sheet 1.

WITNESSES:
F. W. Woerner.
J. A. Walsh.

INVENTOR
Milton T. Campbell,
BY Chester Bradford,
ATTORNEY.

No. 609,498. Patented Aug. 23, 1898.
M. T. CAMPBELL.
BICYCLE.
(Application filed Nov. 15, 1897.)
(No Model.)
2 Sheets—Sheet 2.
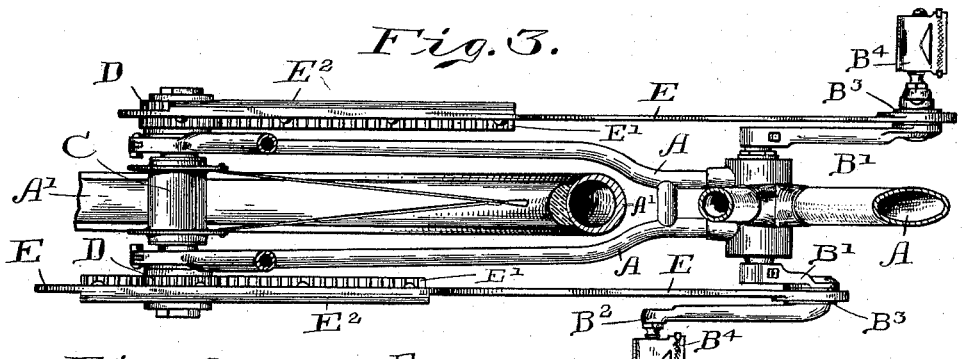
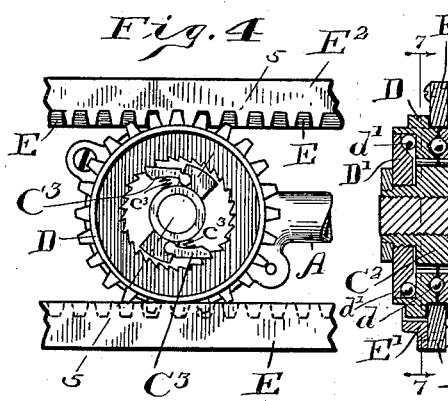
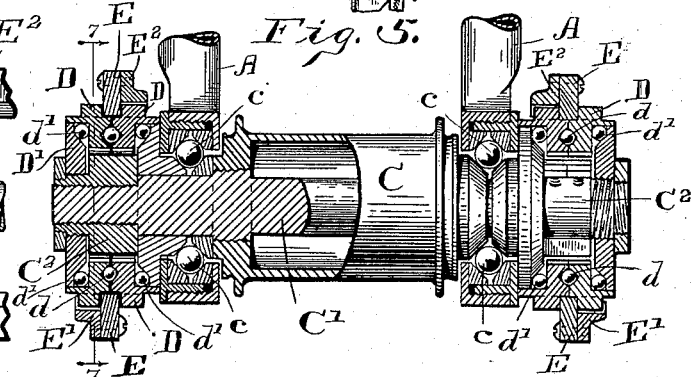
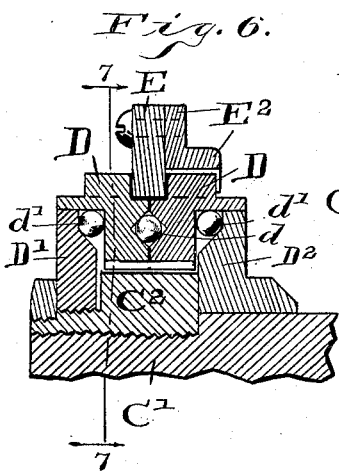
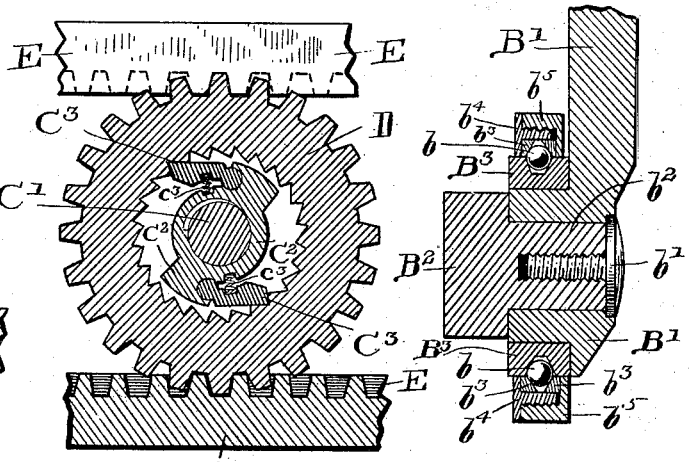
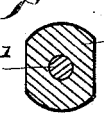
WITNESSES:
F. W. Worner,
J. A. Walsh.
INVENTOR
Milton T. Campbell,
BY
Chester Bradford,
ATTORNEY.
THE NORRIS PETERS CO., PHOTO-LITHO., WASHINGTON, D. C.

UNITED STATES PATENT OFFICE.

MILTON T. CAMPBELL, OF INDIANAPOLIS, INDIANA, ASSIGNOR OF ONE-HALF TO WILLIAM H. THOMAS, OF SAME PLACE.

BICYCLE.

SPECIFICATION forming part of Letters Patent No. 609,498, dated August 23, 1898.

Application filed November 15, 1897. Serial No. 658,615. (No model.)

*To all whom it may concern:*

Be it known that I, MILTON T. CAMPBELL, a citizen of the United States, residing at Indianapolis, in the county of Marion and State of Indiana, have invented certain new and useful Improvements in Bicycles, of which the following is a specification.

As is well understood by bicycle manufacturers and users, the sprocket wheels and chain whereby most commonly the driven wheel of the bicycle is propelled from the crank-shaft are objectionable, for the reason that such wheels and chains have a vast number of wearing-surfaces which as they wear away produce a lengthening of the chain and cause it to fit improperly upon the wheels. Then, too, the joints, which are very numerous, all receive and are subject to the action of dust and dirt, with the consequent increased friction. In most such machines also the strain of driving is all upon one side of the wheel, which causes unevenness of wear.

The object of my present invention is to produce an efficient means of connecting the crank-shaft to the hub of the driven wheel of a bicycle which shall take the place of sprocket wheels and chains and by which many of the disadvantages incident to such connections shall be avoided, while embodying other distinct advantages peculiar to itself.

A bicycle provided with a gearing embodying my present invention will be first fully described, and the novel features thereof then pointed out in the claim.

Figure 1:
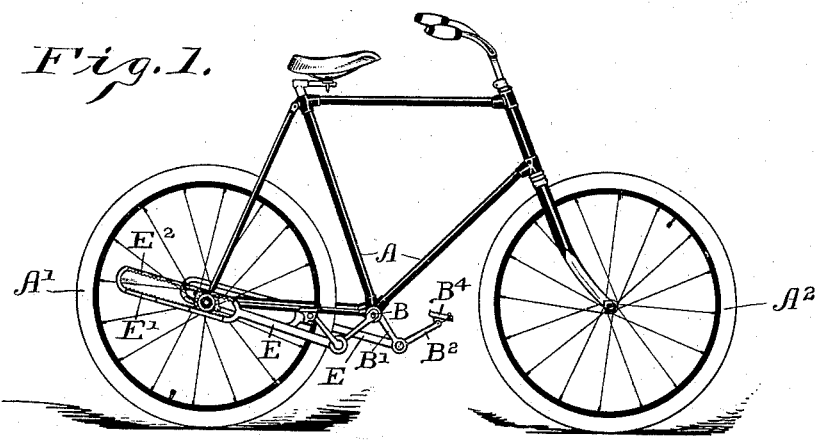
Figure 2:
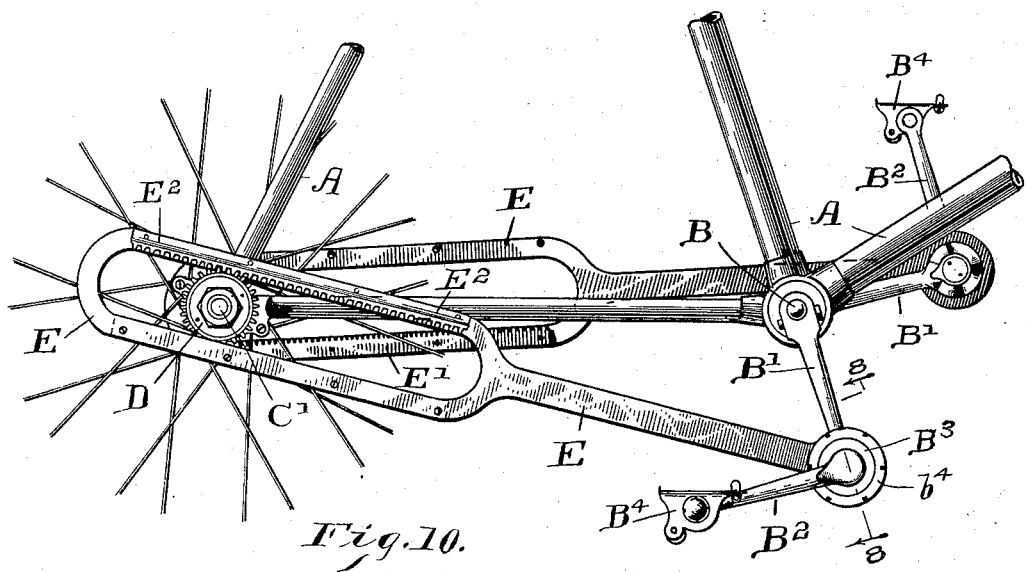

Referring to the accompanying drawings, which are made a part hereof and on which similar letters of reference indicate similar parts, Figure 1 is a side elevation of a bicycle provided with my present invention; Fig. 2, a similar view, on a considerably-enlarged scale, of those portions to which my invention especially relates and the parts immediately adjacent thereto; Fig. 3, a top or plan view of the parts shown in Fig. 2; Fig. 4, a detail elevation, on a still further enlarged scale, showing the engagement of the racks and pinions, the cap covering the internal ratchet being removed; Fig. 5, a view of the hub, partially in section on the dotted line 5 5 in Fig. 4 and partially in elevation, with certain parts broken away, showing the interior construction; Fig. 6, a fragmentary sectional view, on an enlarged scale, similar to a portion of Fig. 5; Fig. 7, a sectional view on the dotted line 7 7 in Figs. 5 and 6; Fig. 8, a detail sectional view through the crank-arm and the connection of the pitman therewith on the dotted line 8 8 in Fig. 2; Fig. 9, a transverse sectional view of the flat-sided projection $b^2$ on the crank-arm $B^2$, and Fig. 10 a plan view of the clutch-bases and their pawls separately.

In said drawings the portions marked A represent the frame of the bicycle; B, the crank-shaft; C, the hub of the driven wheel; D, the gear-rings mounted on said hub; and E, the pitmen uniting said gear-rings D to the crank-arms on the crank-shaft B.

It is my purpose to apply this invention to bicycles generally, and I have therefore illustrated a bicycle of an ordinary form in which the frame A, the wheels $A'$ and $A^2$, and the crank-shaft B are in most particulars of any ordinary or desired construction. The crank-arms are, however, substantially in the form of bell-crank levers, being each composed of two parts $B'$ and $B^2$, which are set at right angles with each other and between which, at the point of union, bearing-rings $B^3$ are secured, whereon the forward ends of the pitmen are mounted. The parts $B'$ of these crank-arms are also placed at right angles with each other on the shaft B, so that the pull on the pitmen is quartering instead of directly opposed. The parts $B^2$ being at right angles with the parts $B'$ and in reverse direction thereto, the pedals $B^4$ are brought back to substantially the same relative position as when straight crank-arms are used and placed in line with each other. By this arrangement I secure an entire absence of "dead-centers" in the pitman connections, while maintaining the position of pedals most convenient for the rider. This is best illustrated in Figs. 1 and 2. The parts $B'$ and $B^2$ are secured together by a flat-sided projection $b^2$ on the latter, extending through a similarly-formed hole in the former, and a cap-screw $b'$, entering said projection, all as shown in Figs. 8 and 9. As shown in the detail sectional view Fig. 8, the bearings between the pitmen and the crank-arms are ball-bearings. The balls $b$ of these bearings rest in ball-races formed by grooves in the bearing-rings $B^3$ and the corresponding faces of the small bearing-rings $b^3$ $b^3$, which latter are inclosed and held in place by the flanged rings $b^4$ $b^5$, which are screw-threaded and engage with each other, and thus inclose and retain said parts, as best shown in Fig. 8.

Figure 10:
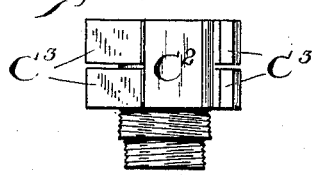

The hub C of the driven wheel A', as best shown in Fig. 5, is rigidly attached to the axle C' and turns therewith, while the frame A is mounted thereon by a suitable ball-bearing construction including the balls $c$. My machine differs in this respect from most bicycles, it being most common for the hub to turn on the axle instead of with the axle. At the ends the axle is provided with rigidly-attached pawl-carrying bases $C^2$, which are in the form of hubs having wings, and in suitable seats in these wings, as best shown in Figs. 4 and 7, I mount a suitable number of pawls $C^3$—preferably one or more pairs—said pawls being normally held outwardly by springs $c^3$. The pawl-seats in the wings of the parts $C^2$ are bounded by curved lines and are somewhat more than semicylindrical in cross-section, and the ends of the pawls are correspondingly formed, so as to be held securely in position therein, while at the same time being free to move into and out of engagement with the ratchet-teeth of the surrounding gear-rings, all as best shown in Fig. 7. I have shown these pawls arranged oppositely to each other, two pawls to each gear-ring; but, obviously, they may be arranged in any relation desired, and one or more pawls to each ring may be employed. As shown in Fig. 10, these said pawls $C^3$ are shown in pairs, the pawls of each pair being arranged side by side and one pawl of each pair being adapted to engage with each of the gear-rings. They might, however, of course, be arranged in different positions, with a single pawl instead of a pair at each point, if desired; but I regard the arrangement shown as the most convenient, for the reason that a single pawl-seat in a wing of the pawl-carrying base is thus adapted to carry two of the pawls. Surrounding each of these pawl-carrying bases are two gear-rings D D, having internal ratchet-faces which are adapted to engage with the pawls $C^3$. These gear-rings, as shown in Figs. 5 and 6, are carried by the balls $d'$ $d'$ on suitable cones D' and $D^2$ and are held from frictional contact with each other by means of the balls $d$. The gear-rings are arranged to travel independently of each other, so that one shall be operated while the pitman is moving forward and the other while said pitman is moving backward, thus applying the power constantly to the shaft and thence to the hub and so to the driven wheel of the bicycle.

The pitmen E pass over the gear-rings D at the ends of the hub of the driven wheel. Each is connected, as above stated, to a crank-arm, and each is provided with two rack-bars E' and $E^2$, engaging with the respective gear-rings. There are two of these pitmen, as shown, one upon each side of the machine, and, as before stated, the connections to the crank-shaft are quartering or at an angle of forty-five degrees with each other, thus avoiding dead-centers, and the adjustments are such that there is always a maximum amount of power applied to the shaft without lost motion and with a minimum amount of friction, while the crank-shaft does not necessarily move except while it is being utilized in driving the machine, as the driven wheel can run forward without rotating the gear-rings, so that the pitmen, crank-arms, and pedals may remain stationary notwithstanding the machine is in motion. It obviously makes no difference which way the crank-shaft is rotated, as rotation thereof in either direction will operate to propel the driven wheel. The rider may therefore change direction of motion at any time, which frequently serves to relieve fatigue.

By means of the construction and arrangement of the crank-arms, pedals, pitmen, and driving-gear which I have described I am enabled to drive the bicycle by pedaling (in either direction) with the complete rotary motion or by merely rocking the crank-shaft slightly, which may be done by moving the feet up and down. By the latter movement I secure a greatly-increased power, although by a correspondingly-shortened stroke of the pitmen, and thus my invention is well adapted to riding over rough and hilly roads. The pedals may also, as above stated, be held still, and thus utilized for resting the feet while coasting.

Having thus fully described my said invention, what I claim as new, and desire to secure by Letters Patent, is—

In a bicycle, the combination, of the frame, the wheels the driving-wheel being fixedly mounted on its axle, cones D', $D^2$ mounted thereon, a bearing for supporting the frame A on ball-bearings between the end of the hub and cone $D^2$, a clutch-base on said axle between said cones D' and $D^2$, spring-clutches mounted thereon in pairs alongside each other, a pair of gear-rings surrounding said base and supported on ball-races in said cones and separated by balls mounted in the races between their adjacent faces, said rings being formed with flanges to cover said races and with external gear and internal racks to engage said pawls, the crank-shaft, the crank-arms, and pitmen carrying a rack to engage the under side of one of said gear-wheels and another to engage the top side of the other one, said construction being duplicated on each end of said axle, all substantially as set forth.

In witness whereof I have hereunto set my hand and seal, at Indianapolis, Indiana, this 12th day of November, A. D. 1897.

MILTON T. CAMPBELL. [L. S.]

Witnesses:
CHESTER BRADFORD,
JAMES A. WALSH.